United States Patent Office 3,117,836
Patented Jan. 14, 1964

3,117,836
PROCESSES FOR THE PRODUCTION OF URANIUM OXIDE
Allan Robert Gibson, Harwell, Ronald George Avery, Oxford, and Leonard Lewis Wassell, Harwell, England, assignors to United Kingdom Atomic Energy Authority, London, England
No Drawing. Filed Sept. 19, 1960, Ser. No. 56,634
Claims priority, application Great Britain Sept. 25, 1959
7 Claims. (Cl. 23—14.5)

This invention relates to processes for the production of uranium oxide and is concerned with producing a substantially pure oxide (as will hereinafter be exampled) from an impure oxide, such as a uranium ore concentrate.

According to the invention a process for the production of a purified uranium oxide from an impure uranium oxide comprises the steps of preparing a suspension of the impure uranium oxide in a melt comprising at least one fused chloride of the group consisting of the alkali and alkaline earth metal chlorides, completely chlorinating the melt and suspended oxide by contacting with chlorine in the presence of carbon, converting uranium tetrachloride present in the melt to uranyl chloride by contacting the melt with oxygen, and selectively precipitating uranium dioxide by contacting the melt with hydrogen. The melt may then be purified by electrolysis to remove impurities which remain in the melt as chlorides, the impurities being deposited on a removable cathode, in order to prepare the melt for a further cycle of the process, or for the recovery of uranium dioxide by electrolysis, as will be described below.

Recovery of the uranium dioxide may be achieved either by simple mechanical removal of a tray containing the precipitate from the bottom of the vessel containing the melt, or by the steps of (1) further contacting the precipitate with chlorine so as to convert it to uranyl chloride and drive it back into solution in the purified melt and (2) electrolysis of the melt to obtain recovery of the uranium as its dioxide by deposition on a further removable cathode. A minor fraction of the uranium may be left in the melt for inclusion in a further cycle of operations, the major fraction of the uranium which is deposited first being of a higher degree of purity than the remaining minor fraction.

A feature of the invention is that all stages of the process can be carried out in one vessel, no transfer of the melt being involved.

The initial melt may conveniently consist of a mixture of sodium and potassium chlorides. Contacting of the chlorinated melt with oxygen may conveniently be achieved by injection of air into the melt.

The product of the invention consists of uranium dioxide of a coarse crystalline nature, the precipitated product consisting of smaller crystals than the electrolytically deposited product, but both being substantially coarser than uranium dioxide derived from hydro-metallurgical processes, such as the hydrogen reduction of oxide produced by the calcining of uranyl nitrate or ammonium diuranate.

The product is very pure, particularly in relation to those impurities having large neutron capture cross sections but further purification can be achieved, without transfer of the melt, by partial recycling as will be hereinafter described.

The product has a high packing density and is suitable for integral fabrication in metallic cans by swaging techniques to produce nuclear fuel elements.

A complete cycle of operations in accordance with a preferred form of the invention for producing high grade electrolytic uranium dioxide from uranium ore concentrate will now be described.

*Stage 1.*—Complete chlorination of the concentrate suspended in a sodium chloride-potassium chloride melt is performed in a vessel fitted with a centrally disposed gas tube terminating at the bottom in a finned carbon block. Injection of chlorine gas provides melt agitation bringing suspended concentrate, carbon and gas into intimate contact and promoting the conversion according to one or other of the equations:

$$UO_2 + 2Cl_2 + C \rightarrow UCl_4 + CO_2$$

or $$UO_2 + 2Cl_2 + 2C \rightarrow UCl_4 + 2CO$$

Oxides of other metals in the concentrate are similarly converted to chlorides. On completion of the chlorination the resultant melt contains all the uranium in soluble form as the tetrachloride, together with many impurities in the form of chlorides.

*Stage 2.*—The chlorine tube together with the attached reducing carbon block is removed from the vessel, and a plain tube inserted reaching just clear of the bottom. Compressed air is injected via this tube, and this has the effect of converting all uranium tetrachloride to uranyl chloride, many of the impurities remaining as chlorides or partially converted oxy-chlorides. No appreciable precipitation takes place at this stage. The conversion of uranium tetrachloride to uranyl chloride is expressed by the equation:

$$UCl_4 + O_2 \rightarrow UO_2Cl_2 + Cl_2$$

*Stage 3.*—Hydrogen gas is injected in place of air through the plain tube and complete removal of uranyl chloride from the melt is obtained by precipitation of uranium dioxide, according to the equation:

$$UO_2Cl_2 + H_2 \rightarrow UO_2 + 2HCl$$

The uranium dioxide formed is sufficiently dense to settle completely, leaving a deep zone of supernatant melt available for purification.

*Stage 4.*—Purification of the sodium-potassium chloride melt is carried out by insertion of electrodes in the melt, and conducting direct current electrolysis at a suitable potential, e.g., at least 3.0 volts, and for the necessary ampere-hours to deposit on the cathode substantially all elements present which are below sodium and potassium in the electromotive series. A gentle stream of hydrogen gas may be directed into the upper region of the melt to provide some agitation and to facilitate electrolysis by keeping such elements in their lowest valence state. After completion of the electrolysis the electrodes are removed from the cell, the cathode bearing the deposit of impurities. At this stage the vessel now contains a melt consisting substantially entirely of sodium and potassium chlorides together with a settled uranium dioxide.

The uranium dioxide may be separated mechanically at this stage or the preceding Stage 3. Alternatively it may be recovered electrolytically by the following Stages 5 and 6.

*Stage 5.*—Chlorine is injected into the settled uranium dioxide and thereby drives the oxide into suspension and re-converts it to uranyl chloride according to the equation:

$$UO_2 + Cl_2 \rightarrow UO_2Cl_2$$

This provides a purified uranyl chloride melt from which the uranium dioxide may be recovered electrolytically.

*Stage 6.*—Recovery of the oxide is achieved by electrolysis with graphite electrodes to give a yield of up to 70% of the total uranium present in the melt. The deposit consists of uranium dioxide and is adherent to the cathode. Complete recovery is not achieved by this electrolysis owing to the formation at the anode of uranium tetrachloride according to the equation:

$$UO_2Cl_2 + C + 2Cl' \rightarrow UCl_4 + CO_2$$

This tetrachloride will redissolve electrolytically deposited oxide according to the equation:

$$UCl_4 + UO_2 \rightarrow 2UOCl_2$$

to form uranium oxychloride. As uranium tetrachloride is not decomposed electrolytically at the potentials employed for the deposition of the oxide the limited recovery of the product is explained. No loss of uranium need be involved, however, as the uranium remaining in the melt may be included in a further cycle of operations.

It is important to note that all stages of the process given above take place in one vessel, no transferring of melts being involved, the end products being high grade uranium dioxide and a pure melt which after suitable addition of sodium-potassium chloride to compensate for extrainment losses is ready for re-use for repetition of the whole cycle.

As mentioned above if precipitated uranium dioxide is required it may be recovered mechanically at the end of Stages 3 or 4 in which case Stages 5 and 6 are omitted. If the precipitate is removed at the end of Stage 3, then Stage 4 may also be omitted in the unlikely event that the melt is not required for a further cycle.

There are two possible sources of contamination of the purified uranium dioxide by residual impurities:

(A) At Stage 3, the hydrogen-precipitated oxide may entrain a small proportion of the unpurified melt which during purification in Stage 4 may not inter-diffuse completely with the main bulk of the melt and hence on re-chlorination in Stage 5 impurities entrained thereby are re-introduced into the melt.

(B) After purification of the melt in Stage 4 some mechanical loss of cathode product may occur during electrode removal and these impurities will by falling into the melt be re-chlorinated in Stage 5.

These sources of contamination may be substantially eliminated by a repetition of Stages 3, 4 and 5 after reaching Stage 5, for only traces of impurities can now remain in the melt locked up in the settled oxide, and a second electrolytic purification in Stage 4 has to deal with only a small amount of impurities present as the result of (B) above. Stage 6, recovery of the uranium dioxide, will then proceed. Alternative or in addition to this extension of the process by repetition of Stages 3, 4 and 5, either the primary product from Stage 6 (electrolytic oxide) or the product of Stage 3 (hydrogen precipitated oxide) may be subjected to electro-refining in a separate melt containing uranyl chloride. In this melt the oxide is made the anode of the cell, dissolve anodically and is re-deposited on a suitable cathode. This electrolysis may be conducted at a low potential, e.g. 0.01 to 0.05 volt, a condition which is favourable to enhancement of the purity of the product.

A practical process in accordance with the invention for producing high grade electrolytic uranium dioxide from a uranium ore concentrate will now be described by way of example.

The uranium ore concentrate was calcined to 300–400° C. to remove water and other volatiles such as carbon dioxide and contained approximately 67% uranium oxide, 0.6% total rare earth oxides and 6% iron oxide.

The apparatus used consisted of a silica closed-ended vessel 10″ long by 3″ internal diameter fitted with a pyrophryllite lid, and heated in an electrical resistance furnace.

The same vessel was used throughout the cycle, being supplied successively with internal fittings appropriate to each stage of the operations.

*1st stage: Complete chlorination.*—The vessel was fitted with a carbon reducing block with a central silica gas tube and charged with 1000 gms. of sodium chloride-potassium chloride eutectic. The assembly was heated to 860° C., chlorine was injected through the silica tube and 230 gms. of the calcined ore concentrate was fed into the melt during a total chlorination time of 2 hours.

*2nd stage: Formation of uranyl chloride.*—The reducing block and tube were removed and a silica tube inserted to the bottom of the vessel. Air was injected through the silica tube into the melt for 1¾ hours, the melt temperature being 860°. All uranium in the melt was now converted to uranyl chloride.

*3rd stage: Removal of uranium from the melt before purification.*—Hydrogen gas was injected into the melt maintained at 860° C. This action continued for 1 hour, and the tube then removed. All uranium was thereby taken out of solution, being precipitated as uranium dioxide. A period of 20 minutes was allowed for settlement of the oxide.

*4th stage: Melt purification by electrolysis.*—Electrodes were now inserted for this electrolysis. These electrodes consisted of a molybdenum plate cathode and a graphite rod anode with a control hole to permit injected hydrogen to pass over the surface of this electrode during electrolysis. The electrodes were inserted to approximately ⅔ of the depth of the melt. The object of the hydrogen injection was to provide gentle melt agitation during electrolysis without disturbing the settled oxide, and also to keep iron and other multi valent elements in the lowest state of valency. The electrolysis was conducted at 4.0 volts for a period of 1¾ hours at a melt temperature of 880° C. The electrodes were then removed, and the deposit of impurities detached from the cathode surface. The deposit contained, in addition to rare earths, a large proportion of the iron content of the original ore concentrate. The purified melt at this stage contained less than 70 parts per million rare earths and 20 parts per million iron.

*Stage 5: Re-solution of uranium dioxide.*—A silica tube having a fluted silica distributor block at its lower end was now inserted to the bottom of the vessel, and chlorine was injected through silica tube into the melt until all uranium dioxide was converted and taken back into solution as uranyl chloride. This conversion took 1 hour operating at a temperature of 880° C.

*Stage 6: Recovery of electrolytic uranium dioxide.*—The silica tube and distributor were removed, and two vertical graphite plate electrodes were inserted in the melt. Direct current was passed for 2¼ hours at a potential rising from 1.0 volt initially to 1.9 volts finally. Temperature of this operation was 870° C. After the electrolysis the electrodes were removed, and the cathode was leached with water, which detached the uranium dioxide crystals. These crystals were washed in hot water, treated with acetone, then diethyl ether, and finally vacuum dried. The recovered weight of oxide was 85.5 gms.—approximately half of that contained in the concentrate used. The uranium still remaining in the melt was present substantially as uranium tetrachloride as a result of the anode reaction during electrolysis.

This melt was then ready to be used for a second cycle by addition of uranium ore concentrate and chlorination to achieve a uranium concentration similar to that in Stage. 1.

An assay of the electrolytic uranium dioxide obtained in the above example showed the presence of the elements listed in the following table which also shows the quantities in parts per million of each element in the product and in the original ore concentrate.

| Element | Product | Ore concentrate |
| --- | --- | --- |
| Lithium | 0.2 | 12 |
| Sodium | 30 | 14,000 |
| Potassium | 150 | 700 |
| Magnesium | 11 | 22,000 |
| Calcium | 25 | 28,000 |
| Cadmium | 0.2 | 3 |
| Boron | 0.2 | 24 |
| Aluminum | 550 | 200 |
| Scandium | 30 | 1,400 |
| Yttrium | 30 | 400 |
| Lanthanides | less than 40 | |
| Silicon | 200 | 2,300 |
| Titanium | 11 | 5,600 |
| Thorium | 250 | 4,500 |
| Vanadium | 3 | 2,000 |
| Chromium | 8 | 200 |
| Iron | 10 | 37,000 |

It is apparent that the process according to the invention achieves a substantial purification of the oxide, the iron content having been reduced from 3.7% to 10 parts per million and the rare earth metal content from about 0.4% to less than 100 parts per million. Furthermore the content of elements of high neutron absorption cross section has also been substantially reduced, e.g., cadmium, boron, the lanthanide elements, and thorium.

We claim:
1. A process for the production of substantially pure uranium dioxide from an impure uranium oxide comprising suspending the impure uranium oxide in a fused melt having at least one chloride selected from the group consisting of the alkali metal chlorides and the alkaline earth metal chlorides, contacting the melt containing the uranium oxide with chlorine in the presence of carbon to completely chlorinate same and to form uranium tetrachloride in said melt; contacting the melt with oxygen to convert the uranium tetrachloride therein to uranyl chloride; contacting the melt with hydrogen to convert the uranyl chloride formed therein to uranium dioxide which precipitates from said melt, and recovering the uranium dioxide from the melt.

2. A process in accordance with claim 1, wherein the impure uranium oxide is a uranium oxide ore concentrate.

3. A process for the production of substantially pure uranium dioxide from an impure uranium oxide comprising suspending the impure uranium oxide in a fused melt having at least one chloride selected from the group consisting of the alkali metal chlorides and the alkaline earth metal chlorides, contacting the melt containing the uranium oxide with chlorine in the presence of carbon to completely chlorinate same and to form uranium tetrachloride in said melt; contacting the melt with oxygen to convert the uranium tetrachloride therein to uranyl chloride; contacting the melt with hydrogen to convert the uranyl chloride formed therein to uranium dioxide which precipitates from said melt, effecting electrolysis of the melt and the precipitated uranium dioxide to purify the melt by removing impurities dissolved in the melt as chlorides on a removable cathode, and recovering the precipitated uranium dioxide from the purified melt.

4. A process for the production of substantially pure uranium dioxide from an impure uranium oxide comprising suspending the impure uranium oxide in a fused melt having at least one chloride selected from the group consisting of the alkali metal chlorides and the alkaline earth metal chlorides, contacting the melt containing the uranium oxide with chlorine in the presence of carbon to completely chlorinate same and to form uranium tetrachloride in said melt; contacting the melt with oxygen to convert the uranium tetrachloride therein to uranyl chloride; contacting the melt with hydrogen to convert the uranyl chloride formed therein to uranium dioxide which precipitates from said melt, effecting electrolysis of the melt and the precipitated uranium dioxide to purify the melt by removing impurities dissolved in the melt as chlorides on a removable cathode, and contacting the precipitated uranium dioxide with chlorine to convert same into uranyl chloride which goes into suspension in said melt, and effecting electrolysis of the melt to deposit substantially pure uranium dioxide on a further removable electrode.

5. A process according to claim 4, comprising the further step of electro-refining the deposited uranium dioxide by making the uranium dioxide the anode of a further cell in which the electrolyte is a melt containing uranyl chloride and electrolysing at a potential of 0.01 to 0.05 volt to re-deposit uranium dioxide on a suitable cathode.

6. A process in accordance with claim 4, in which a major proportion of the uranium dioxide in the melt is deposited on the cathode and a minor proportion remains in solution in the melt, and further impure uranium oxide is combined with the melt thereby to initiate a new cycle of purification.

7. A process in accordance with claim 4, wherein the steps of contacting the melt with hydrogen, effecting electrolysis to remove impurities, and contacting the melt with chlorine are repeated before the substantially pure uranium dioxide is recovered from the melt by electrolysis.

References Cited in the file of this patent

UNITED STATES PATENTS

| | | |
| --- | --- | --- |
| 2,739,111 | Noland et al. | Mar. 20, 1956 |
| 2,752,303 | Cooper | June 26, 1956 |
| 2,758,023 | Bareis | Aug. 7, 1956 |
| 2,887,356 | Arnoff | May 19, 1959 |
| 2,890,099 | Rhodes | June 9, 1959 |
| 2,948,586 | Moore | Aug. 9, 1960 |

OTHER REFERENCES

Katz et al.: "The Chemistry of Uranium," pp. 316, 317, 486 (1951), McGraw-Hill Book Co., N.Y.C.

Niedrach et al.: "Ind. and Eng. Chem.," vol. 48, No. 6, June 1956, pp. 977, 981.

KAPL–1761, pp. 9, 19–22, 28, 29, 38, 40–42, 46, 52, 53, April 30, 1957.